UNITED STATES PATENT OFFICE.

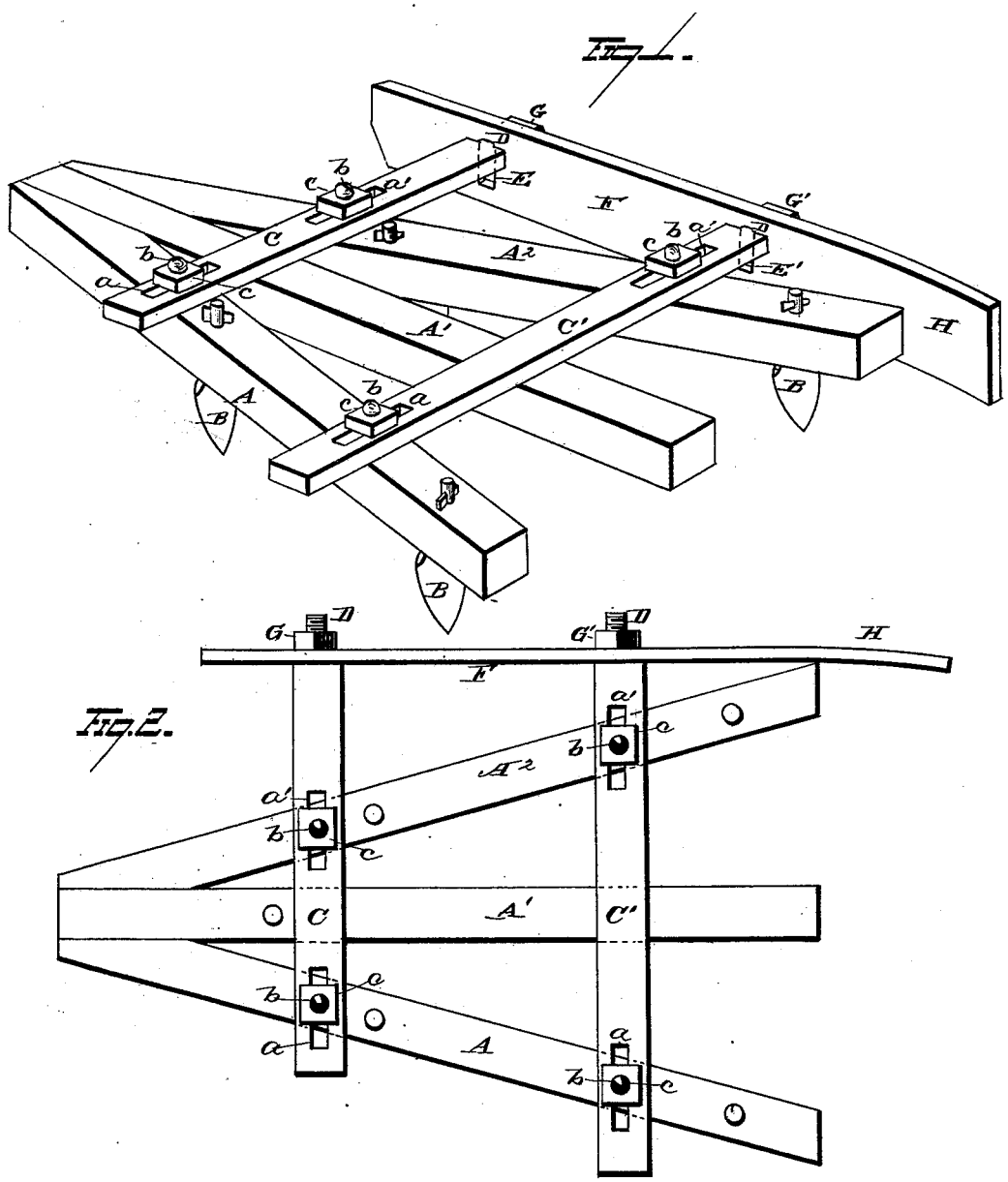

JOHN T. DOUGLASS, OF EAST LIVERPOOL, OHIO.

CULTIVATOR-GUARD.

SPECIFICATION forming part of Letters Patent No. 235,140, dated December 7, 1880.

Application filed August 13, 1880. (No model.)

*To all whom it may concern:*

Be it known that I, JOHN T. DOUGLASS, of East Liverpool, in the county of Columbiana and State of Ohio, have invented certain new and useful Improvements in Cultivator-Guards; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in cultivator-guards, the object being to provide a guard attachment for cultivators which may be adjusted both laterally and vertically to prevent the earth and clods from being turned over onto and destroying the growing corn, tobacco, &c., the attachment being of such construction that it shall serve the double purpose of bracing the cultivator-frame and admitting of the adjustable attachment of the cultivator-guard.

To these ends my invention consists in the several details of construction and combinations of parts, as will hereinafter be described, and pointed out in the claim.

In the accompanying drawings, Figure 1 is a view, in perspective, of a cultivator provided with my improved cultivator-guard, and Fig. 2 is a plan view of the same.

A A' A² represent the three converging frame-pieces or shovel-beams of an ordinary cultivator, having suitably-constructed shovels B secured thereto in any desired manner. To the upper side of the frame of the cultivator are secured the transverse braces C C', each of which is provided with elongated slots $a$ $a'$ at its opposite ends, through which slots are inserted the bolts $b$, which latter extend through the frame-pieces of the cultivator, and are secured by means of the nuts $c$.

The braces C C' project outwardly from one side of the cultivator-frame, and are provided on their ends with screw-threaded lugs D, which fit in the vertical slots E E', formed in the cultivator-guard F, the latter being secured to the ends of the braces by means of the nuts G G'.

Cultivator-guard F may be made of wood or metal, as desired, and may be constructed of any desired width and length.

The rear end, H, of the cultivator-guard is preferably bent or curved inwardly, in order to deflect the earth or clods turned up by the rear shovel inwardly and into the groove formed by said shovel, and thereby prevent the clods from falling onto the corn and injuring or destroying it.

The cultivator-guard is provided with elongated vertical slots, in order that it may be secured in any desired vertical adjustment, which will be regulated according to the character of the soil to be cultivated. Again, the guard is adapted to be adjusted laterally according to the distance between the rows of corn, and the lateral adjustment is effected by loosening the nuts $c$ and moving the braces C C' laterally, and thus moving the guard toward or from the cultivator until it has been properly adjusted, when the nuts are tightened, and the guard thereby firmly secured in place.

Braces C C', it will be observed, serve not only as adjustable supports for the cultivator-guard, but also serve as braces for the cultivator-frame, and prevent the outside frames from becoming displaced.

I am aware that it is not broadly new to combine a guard with a cultivator; that the standard of a cultivator has had a laterally-adjustable frame connected therewith, and to said frame has been secured a vertically-adjustable guard.

I am also aware that a guard has been attached to a beam pivoted to a cultivator; hence I would have it understood that I make no broad claim to a guard in combination with a cultivator, as my invention consists in the particular construction and combination of parts shown, described, and pointed out in the claim.

Having fully described my invention, what

I claim as new, and desire to secure by Letters Patent, is—

The combination, with the diverging beams of a cultivator and braces C C', provided with elongated slots a and bolts b, inserted through said slots and fastened to the outer diverging beams, of the cultivator-guard F, provided with vertically-elongated slots, in which are inserted the outer ends of braces C C', and the guard adjustably secured thereto, substantially as set forth.

In testimony that I claim the foregoing I have hereunto set my hand this 2d day of August, 1880.

JOHN T. DOUGLASS.

Witnesses:
 R. W. TAYLER,
 HENRY H. LINES.